United States Patent
Sakai et al.

(10) Patent No.: US 8,256,874 B2
(45) Date of Patent: Sep. 4, 2012

(54) DROPLET DISCHARGE DEVICE

(75) Inventors: Hirofumi Sakai, Nagano (JP); Toru Shinohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 308 days.

(21) Appl. No.: 12/780,304

(22) Filed: May 14, 2010

(65) Prior Publication Data

US 2010/0295898 A1  Nov. 25, 2010

(30) Foreign Application Priority Data

May 20, 2009  (JP) .................................. 2009-121696

(51) Int. Cl.
*B41J 2/15* (2006.01)
*B41J 2/145* (2006.01)

(52) U.S. Cl. .......................................... 347/40; 347/15

(58) Field of Classification Search ..................... 347/14, 347/15, 19, 40, 43, 54, 57
See application file for complete search history.

(56) References Cited

U.S. PATENT DOCUMENTS

| 6,366,025 | B1 | 4/2002 | Yamada | |
|---|---|---|---|---|
| 6,471,352 | B2 * | 10/2002 | Akahira | ........................ 347/106 |
| 2005/0008769 | A1 | 1/2005 | Sakai | |

FOREIGN PATENT DOCUMENTS

| JP | 2004-358299 A | 12/2004 |
|---|---|---|
| JP | 2007-017477 A | 1/2007 |
| JP | 2008-300367 A | 12/2008 |

* cited by examiner

*Primary Examiner* — Thinh Nguyen
(74) *Attorney, Agent, or Firm* — Global IP Counselors, LLP (57) ABSTRACT

A droplet discharge device includes a plurality of discharge heads configured and arranged to discharge droplets toward a plurality of pattern film formation regions disposed on a substrate with the pattern film formation regions including at least one narrow pattern film formation region that is narrower than the other pattern film formation regions. A number of the discharge heads corresponding to the narrow pattern film formation region is greater than a number of the discharge heads corresponding to one of the pattern film formation regions having an area that is larger than that of the narrow pattern film formation region.

4 Claims, 7 Drawing Sheets

DROPLET DISCHARGE DEVICE

CROSS-REFERENCE TO RELATED APPLICATIONS

This application claims priority to Japanese Patent Application No. 2009-121696 filed on May 20, 2009. The entire disclosure of Japanese Patent Application No. 2009-121696 is hereby incorporated herein by reference.

BACKGROUND

1. Technical Field

The present invention relates to a droplet discharge device.

2. Related Art

Inkjet droplet discharge devices have been known as devices for forming a pattern film on a substrate. The droplet discharge device is provided with a discharge head for discharging a functional liquid as droplets constituting the material of the pattern film toward the substrate. For example, a plurality of discharge heads that correspond to color elements is provided in the case that a pattern film having a plurality of color elements is to be formed, such as in an organic EL device or the like.

In the organic EL device noted above, each color element has a different degradation speed and white-balance is compromised. There is accordingly a known configuration in which the luminous surface area is varied in accordance with the luminous efficiency of the color elements, e.g., the luminous surface area is gradually increased as the luminous efficiency is reduced. Specifically, the configuration provides the color elements have different sizes of the surface area of the pattern film formation region (e.g., see Japanese Laid-Open Patent Application No. 2008-300367).

SUMMARY

In the droplet discharge device described above, the substrate and the discharge heads move in a relative fashion, functional liquid is discharged as droplets from the discharge heads toward the substrate in the movement step, and the functional liquid is coated onto the substrate. However, the relative speed between the substrate and the discharge heads and the discharge amount per unit surface area discharged from the discharge heads is limited by the efficiency of processability, work conditions, and the like when the droplets are discharged toward the substrate. Accordingly, when the sizes of the pattern film formation regions differ, such as in the organic EL device or the like noted above, the discharge amount in pattern film formation regions having a small region surface area is less than the discharge amount in the pattern film formation regions having a large region surface area when droplets are discharged from the discharge heads that correspond to each region, and there is a problem in that the discharge process must be repeated in order to ensure that the discharge amount (coating amount) reaches a specified amount and the work time is therefore increased.

The present invention was contrived in order to solve at least a portion of the above-described problem, and can be implemented as the following embodiments or application examples.

A droplet discharge device according to a first aspect includes a plurality of discharge heads configured and arranged to discharge droplets toward a plurality of pattern film formation regions disposed on a substrate with the pattern film formation regions including at least one narrow pattern film formation region that is narrower than the other pattern film formation regions. A number of the discharge heads corresponding to the narrow pattern film formation region is greater than a number of the discharge heads corresponding to one of the pattern film formation regions having an area that is larger than that of the narrow pattern film formation region.

In accordance with this configuration, the number of discharge heads is suitably specified in accordance with the size of the pattern film formation regions. In other words, a larger number of discharge heads is arranged in narrow pattern film formation regions than the number of discharge heads that correspond to wide pattern film formation regions. Therefore, a larger number of droplets can be discharged in a short amount of time in the narrow pattern film formation regions. A good balance in the discharge amounts is ensured between the discharge amount of droplets in the narrow pattern film formation regions and the droplet discharge amount of droplets in the wide pattern film formation regions, and the amount of time required for droplet discharge work can be reduced.

In the droplet discharge device as described above, the discharge heads corresponding to the pattern film formation regions are preferably aligned in a scan direction, in which the substrate and the discharge heads move relative to one another, according to a sequence in which the pattern film formation regions are aligned in the scan direction.

In accordance with this configuration, a plurality of discharge heads is arranged in accordance with the array sequence of the pattern film formation regions. In other words, the discharge heads that correspond to the pattern film formation regions are arranged in accordance with the arrangement sequence of the pattern film formation regions in the case that narrow pattern film formation regions and wide pattern film formation regions are aligned in sequence, for example. Droplets can thereby be discharged into target pattern film formation regions with good efficiency in a single scan cycle.

In the droplet discharge device as described above, the number of the discharge heads corresponding to the narrow pattern film formation region is preferably greater than the number of the discharge heads corresponding to one of the pattern film formation regions having a width that is larger than that of the narrow pattern film formation region in a scan direction, in which the substrate and the discharge heads move relative to one another, when widths of the pattern film formation regions are different in the scan direction.

In accordance with this configuration, the number of discharge heads is suitably specified in accordance with the widths of the pattern film formation regions in the scan direction. In other words, a larger number of discharge heads is arranged in narrow pattern film formation regions than the number of discharge heads that correspond to wide pattern film formation regions. Therefore, a larger number of droplets can be discharged in a short amount of time in the narrow pattern film formation regions. A good balance in the discharge amounts is ensured between the discharge amount of droplets in the narrow pattern film formation regions and the droplet discharge amount of droplets in the wide pattern film formation regions, and the amount of time required for droplet discharge work can be reduced.

In the droplet discharge device as described above, the number of the discharge heads corresponding to the narrow pattern film formation region is preferably equal to or greater than the nth multiple of the number of the discharge heads corresponding to one of the pattern film formation regions having the width that is larger than that of the narrow pattern film formation region, when the width of the narrow pattern film formation region is 1/n of the width of the one of the pattern film formation regions.

In accordance with this configuration, the balance of the discharge amounts between the discharge amount of droplets in the narrow pattern film formation regions and the discharge amount of droplets in the wide pattern film formation regions can be readily assured by specifying the number of discharge heads on the basis of the ratio of the widths of the pattern film formation regions.

BRIEF DESCRIPTION OF THE DRAWINGS

Referring now to the attached drawings which form a part of this original disclosure.

DETAILED DESCRIPTION OF EXEMPLARY EMBODIMENTS

The present invention is described below using specific embodiments with reference to the drawings. The members in the drawings are provided with a sufficient size to allow recognition in the drawings and each member is therefore illustrated with a varying scale.

Configuration of Droplet Discharge Device

Overall Configuration

Figure 1:
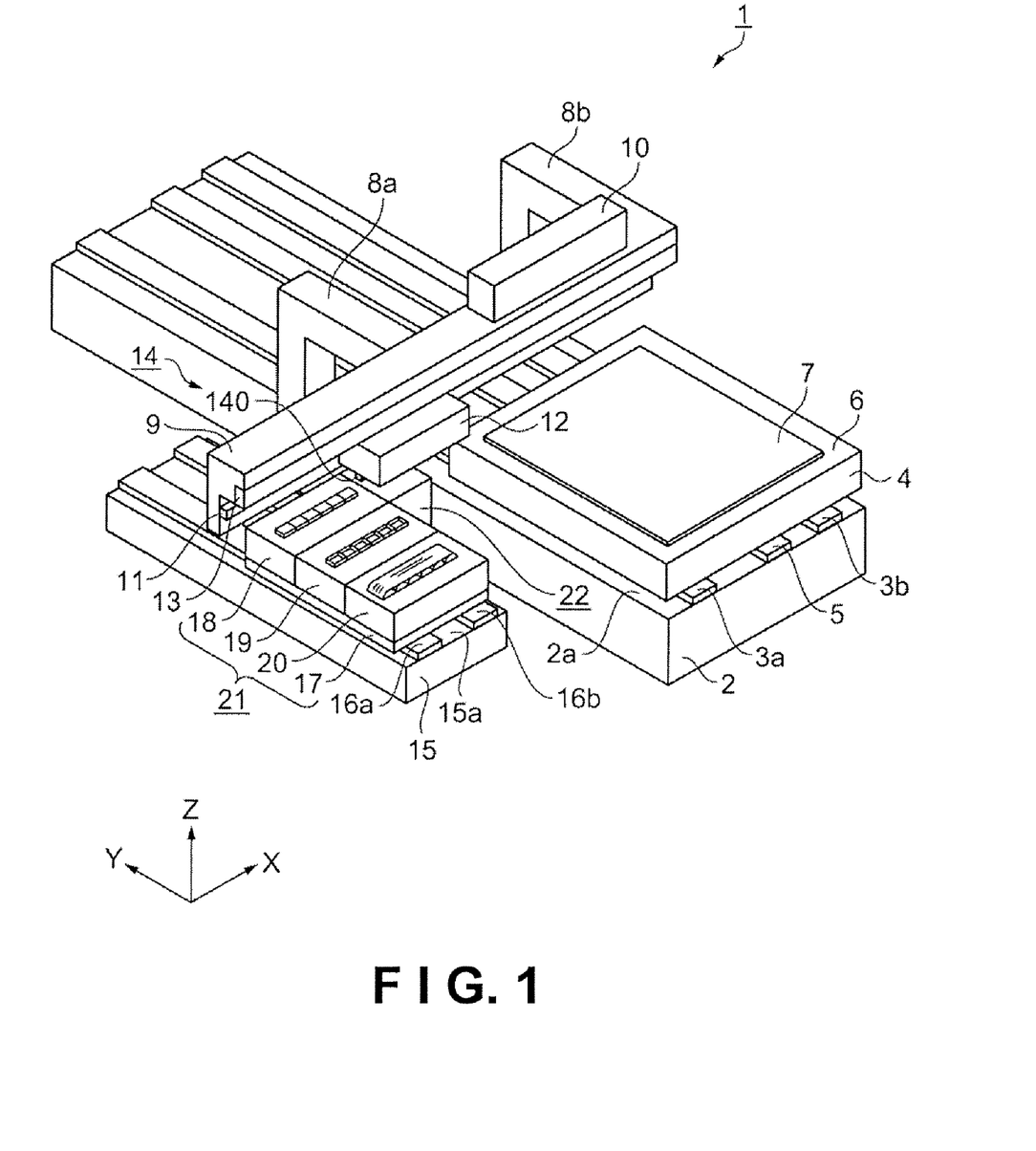
FIG. 1 is a perspective view showing the configuration of the droplet discharge device.

First, the overall configuration of the droplet discharge device will be described. FIG. 1 is a perspective view showing the configuration of the droplet discharge device. A platform 2 formed in a rectangular parallelepiped shape is provided to the droplet discharge device 1. In the present embodiment, the Y direction is the lengthwise direction of the platform 2 and the X direction is the direction orthogonal to the Y direction.

A pair of guide rails 3a, 3b that extend in the Y direction is provided in protruding fashion across the entire Y direction width on the upper surface 2a of the stage 2. A stage 4 is mounted on the upper side of the platform 2 and the stage acts as a table and work movement table that constitutes scanning means provided with a translational drive mechanism (not shown) that corresponds to the pair of guide rails 3a, 3b. The translational drive mechanism of the stage 4 is a screw-type translation drive mechanism provided with a screw shaft (drive shaft) extending in the Y direction along, e.g., the pair of guide rails 3a, 3b, and a ball nut that threads together with the screw shaft. The drive shaft is connected to a Y-shaft motor (not shown) that receives predetermined pulse signals and rotates normally and in reverse in step units. When a drive signal that corresponds to a predetermined of steps is presented to the Y-axis motor, the Y-axis motor rotates normally or in reverse, and the stage 4 moves in one direction or the opposite direction (scans in the Y direction) at a predetermined speed along the Y-axis direction by an amount commensurate to the number of steps.

A primary scan position detection device 5 is arranged on the upper surface 2a of the platform 2 so as to be parallel to the pair of guide rails 3a, 3b, and the position of the stage 4 can be measured.

A mounting surface 6 is formed on the upper surface of the stage 4, and a vacuum-type substrate chucking mechanism (not shown) is provided to the mounting surface 6. When a substrate 7 is mounted on the mounting surface 6, the substrate 7 is positioned and secured by the substrate chucking mechanism in a predetermined position on the mounting surface 6.

A pair of supports 8a, 8b is erectly provided to the two sides of the platform 2 in the X direction, and a guide member 9 that extends in the X direction is mounted on the pair of supports 8a, 8b. The guide member 9 is formed so that the width in the lengthwise direction is greater than that of the stage 4 in the X direction, and one end of the guide member 9 is arranged so as to protrude to the support 8a side. A storage tank 10 for suppliably storing liquid to be discharged is arranged on the upper side of the guide member 9. A guide rail 11 that extends in the X direction is provided in a protruding fashion across the entire width in the X direction to the lower side of the guide member 9.

A carriage 12 movably disposed along the guide rail 11 is formed in a substantially rectangular parallelepiped. The translational drive mechanism of the carriage 12 is a screw-type translation drive mechanism provided with a screw shaft (drive shaft) extending in the X direction along the guide rail 11, for example, and a ball nut that threads together with the screw shaft. The drive shaft is connected to an X-shaft motor (not shown) that receives predetermined pulse signals and rotates normally and in reverse in step units. When a drive signal that corresponds to a predetermined of steps is presented to the X-axis motor, the X-axis motor rotates normally or in reverse, and the carriage 12 moves in one direction or the opposite direction (scans in the X direction) along the X-axis direction by an amount commensurate to the number of steps. A secondary scan position detection device 13 is disposed between the guide member 9 and the carriage 12 so as to be capable of determining the position of the carriage 12. A head unit 14 provided with a plurality of discharge heads 140 is provided in a protruding fashion to the lower surface (the surface on stage 4 side) of the carriage 12.

A maintenance platform 15 is disposed on one end of the platform 2 (reverse direction of the X direction in the drawing). A pair of guide rails 16a, 16b that extend in the Y direction is provided in protruding fashion across the entire Y direction width on the upper surface 15a of the maintenance platform 15. A maintenance stage 17 constituting movement means provided with a translational drive mechanism (not shown) that that corresponds to the pair of guide rails 16a, 16b is mounted on the upper side of the maintenance platform 15. The translational drive mechanism of the maintenance stage 17 is a translational drive mechanism similar to that of the stage 4, for example, and is designed to move in outbound or inbound in the Y direction.

A flushing unit 18, a capping unit 19, and a wiping unit 20 are arranged on the maintenance stage 17. The flushing unit 18 is a device for catching droplets discharged from the plurality of discharge heads 140 when the flow channels inside the plurality of discharge heads 140 are washed. When solid matter contaminates the plurality of discharge heads 140, droplets are discharged from the discharge heads 140 in order to remove the solid matter from the discharge heads 140. The flushing unit 18 functions to catch the droplets.

The capping unit 19 is a device for capping the discharge heads 140. The droplets discharged from the discharge heads 140 may be volatile, and the viscosity of the functional liquid may vary and the nozzles may become clogged when the solvent of the functional liquid inside the discharge heads 140 volatilizes. The capping unit 19 caps the discharge heads 140 and thereby prevents the nozzles from clogging.

The wiping unit 20 is a dive for wiping a nozzle plate in which the nozzles of the discharge heads 140 are arranged. The nozzle plate is a member disposed on the head unit 14 on the surface of the side facing the substrate 7. When droplets are deposited on the nozzle plate, the droplets deposited on the nozzle plate come into contact with the substrate 7, and the droplets become deposited in an unexpected location on the substrate 7. The wiping unit 20 wipes the nozzle plate and thereby prevents droplets from become deposited in an unexpected location on the substrate 7.

A weight measurement device 22 is disposed between the maintenance platform 15 and the platform 2. The weight measurement device 22 has two electronic scales, and each electronic scale has a receptacle. Droplets are discharged from the discharge heads 140 into the receptacle, and the electronic scale weighs the droplets. The receptacle is provided with a sponge-shaped absorber that prevents the discharged droplets from splashing out of the receptacle. The electronic scales weigh the receptacle before and after the discharge heads 140 discharge the droplets, and measure the difference in the weight of the receptacle before and after discharge.

The carriage 12 moves in the X direction along the guide rail 11, whereby the discharge heads 140 can move to a location that faces a head cleaning unit 21, the weight measurement device 22, and the substrate 7 and discharge droplets.

Configuration of Discharge Heads

Figure 2:
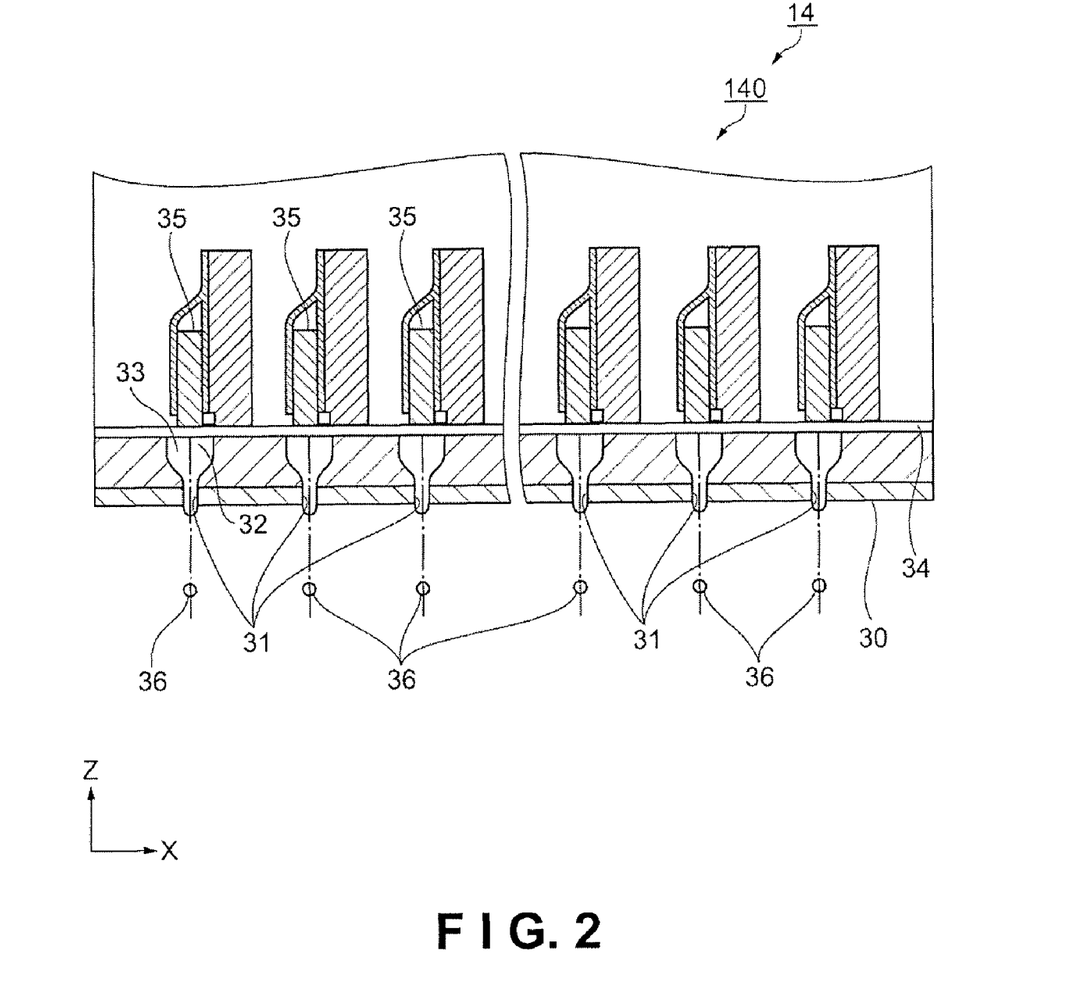
FIG. 2 is a cross-sectional view showing the configuration of the discharge heads.

FIG. 2 is a cross-sectional view showing the configuration of the discharge heads. The discharge heads 140 are provided with a nozzle plate 30, as shown in FIG. 2, and nozzles 31 are formed in the nozzle plate 30. Cavities 32 that are in communication with the nozzles 31 are formed above the nozzle plate 30 in positions that correspond to the nozzles 31. A functional liquid 33 stored in the storage tank 10 is fed to the cavities 32 of the discharge heads 140.

Provided above the cavities 32 are a vibration plate 34 that vibrates in the vertical direction (Z direction: longitudinal vibration) and expands and contracts the volume inside the cavities 32; and piezoelectric elements 35 used as pressure application means for causing the vibration plate 34 expand, contact, and vibrate in the vertical direction. The piezoelectric elements 35 expand and contract in the vertical direction, the vibration plate 34 vibrates, and the vibration plate 34 expands and contracts the volume inside the cavities 32 to apply pressure to the cavities 32. Therefore, the pressure inside the cavities 32 is made to fluctuate and the functional liquid 33 fed to the cavities 32 is discharged through the nozzles 31.

When the discharge heads 140 receive a drive signal for controlling and driving the piezoelectric elements 35, the piezoelectric elements 35 extend and the vibration plate 34 reduces the volume inside the cavities 32. As a result, the functional liquid 33 is discharged as droplets 36 from the nozzles 31 of the discharge heads 140 in an amount equivalent to the reduced volume. In the present embodiment, longitudinal vibration-type piezoelectric elements 35 are used as pressure application means, but no particular limitation is imposed thereby, and it is also possible to, e.g., use bending deformation-type piezoelectric elements formed by layering a lower electrode, a piezoelectric layer, and an upper electrode. It is also possible to use a so-called electrostatic actuator or the like as pressure generation means in which static electricity is generated between the vibration plate and the electrode and the electrostatic force causes the vibration plate to deform and discharge a droplet from the nozzle. It is also possible to use a discharge head having a configuration in which foam is generated inside the nozzle using a heating element, and the functional liquid is discharged as a droplet by the foam.

Configuration of Electrical Control

Figure 3:
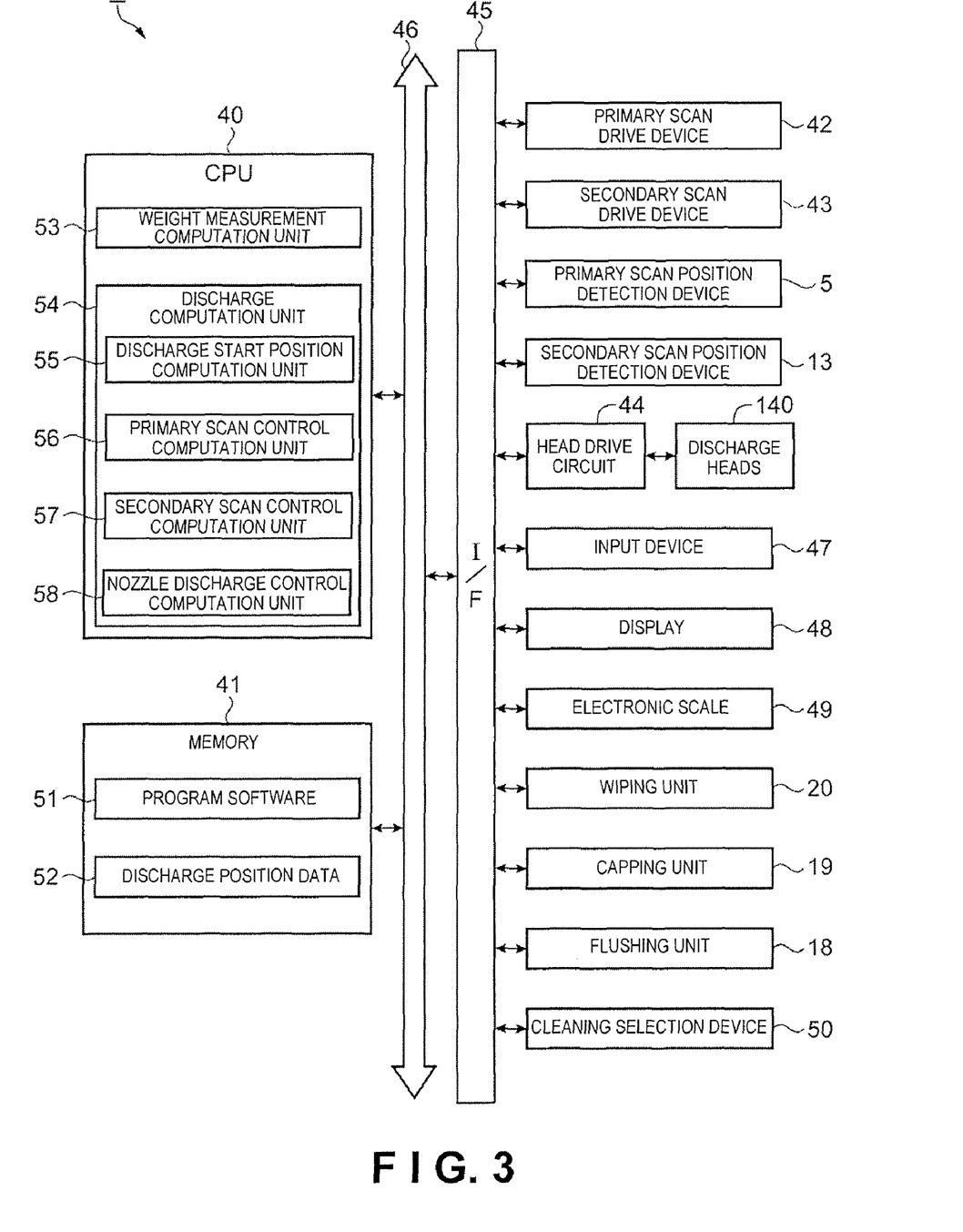
FIG. 3 is an electrical control block diagram of the droplet discharge device.

FIG. 3 is an electrical control block diagram of the droplet discharge device. In FIG. 3, the droplet discharge device 1 has a CPU (computation processing device) 40 for carrying out various computational processes as a processor, and a memory 41 for storing various information.

A primary scan drive device 42, a secondary scan drive device 43, a primary scan position detection device 5, a secondary scan position detection device 13, and a head drive circuit 44 for driving the discharge heads 140 are connected to the CPU 40 via an I/O interface 45 and a bus 46. Furthermore, an input device 47, a display 48, an electronic scale 49 constituting the weight measurement device 22 shown in FIG. 1, the flushing unit 18, the capping unit 19, and the wiping unit 20 are also connected to the I/O interface 45 and the bus 46. Similarly, in the head cleaning unit 21, a cleaning selection device 50 for selecting a single unit is also connected to the CPU 40 via the I/O interface 45 and the bus 46.

The primary scan drive device 42 is a device for controlling the movement of the stage 4, and the secondary scan drive device 43 is a device for controlling the movement of the carriage 12. The primary scan position detection device 5 recognizes the position of the stage 4, and the primary scan drive device 42 controls the movement of the stage 4, whereby the stage 4 can be moved to and stopped in a desired position. Similarly, the secondary scan position detection device 13 recognizes the position of the carriage 12, and the secondary scan drive device 43 controls the movement of the carriage 12, whereby the carriage 12 can be moved to and stopped in a desired position.

The input device 47 is a device for inputting various processing conditions for discharging droplets, and is, e.g., a device for receiving from an external device the coordinates for discharging droplets onto the substrate 7. The display 48 is a device for displaying processing conditions or work conditions, and the operator carries out operations using an input device 47 on the basis of information displayed on the display 48.

The electronic scale 49 is a device for weighing a receptacle that receives droplets discharged by the discharge heads 140. The receptacle is weighed before and after droplet discharge and the measured value is transmitted to the CPU 40. The weight measurement device 22 shown in FIG. 1 is composed of a receptacle, an electronic scale 49, and the like.

The cleaning selection device 50 is a device for selecting and moving a single device from among the flushing unit 18, the capping unit 19, and the wiping unit 20, which are the head cleaning unit 21, to a location facing the discharge heads 140.

The memory 41 is a concept that includes semiconductor memory such as RAM and ROM, and external memory such as hard disk and CD-ROM. In terms of function, there are a storage area for storing program software 51 that dictates operation control procedures in the droplet discharge device 1, and a storage area for storing discharge position data 52, which is coordinate data of discharge positions on the substrate 7. There are also a storage area for storing the primary scan movement distance for moving the substrate 7 in primary scan direction (Y direction) and the secondary scan movement distance for moving the carriage 12 in the secondary scan direction (X direction), a storage area that functions as temporary file storage or as a work area for the CPU 40, and various other storage areas.

The CPU 40 carries out control for discharging droplets of functional liquid in a predetermined position on the surface in the substrate 7 in accordance with the program software 51 stored in the memory 41. As specific function implementation units, there is a weight measurement computation unit 53 for carrying out computations for implementing weight measurement using the electronic scale 49, and a discharge computation unit 54 for carrying out computations for discharging droplets using the discharge heads 140.

The discharge computation unit 54 can be more specifically subdivided. The discharge computation unit 54 has a discharge start position computation unit 55 for positioning the discharge heads 140 in an initial position for droplet discharge, and a primary scan control computation unit 56 for computing control for scanning/moving the substrate 7 in the primary scan direction (Y direction) at a predetermined speed. The discharge computation unit 54 additionally has a secondary scan control computation unit 57 for computing control for moving the discharge heads 140 a predetermined secondary scan distance in the secondary scan direction (X direction). The discharge computation unit 54 furthermore has, among various other function computation units, a nozzle discharge control computation unit 58 for carrying out computation for controlling whether to actuate any of the plurality of nozzles in the discharge heads 140 to discharge functional liquid.

The maintenance stage 17 moves along the guide rails 16a, 16b, whereby one device among the flushing unit 18, the capping unit 19, and the wiping unit 20 is disposed in a location facing the discharge heads 140. The flushing unit 18, the capping unit 19, and the wiping unit 20 constitute the head cleaning unit 21.

Arrangement of Discharge Heads

Figure 4:
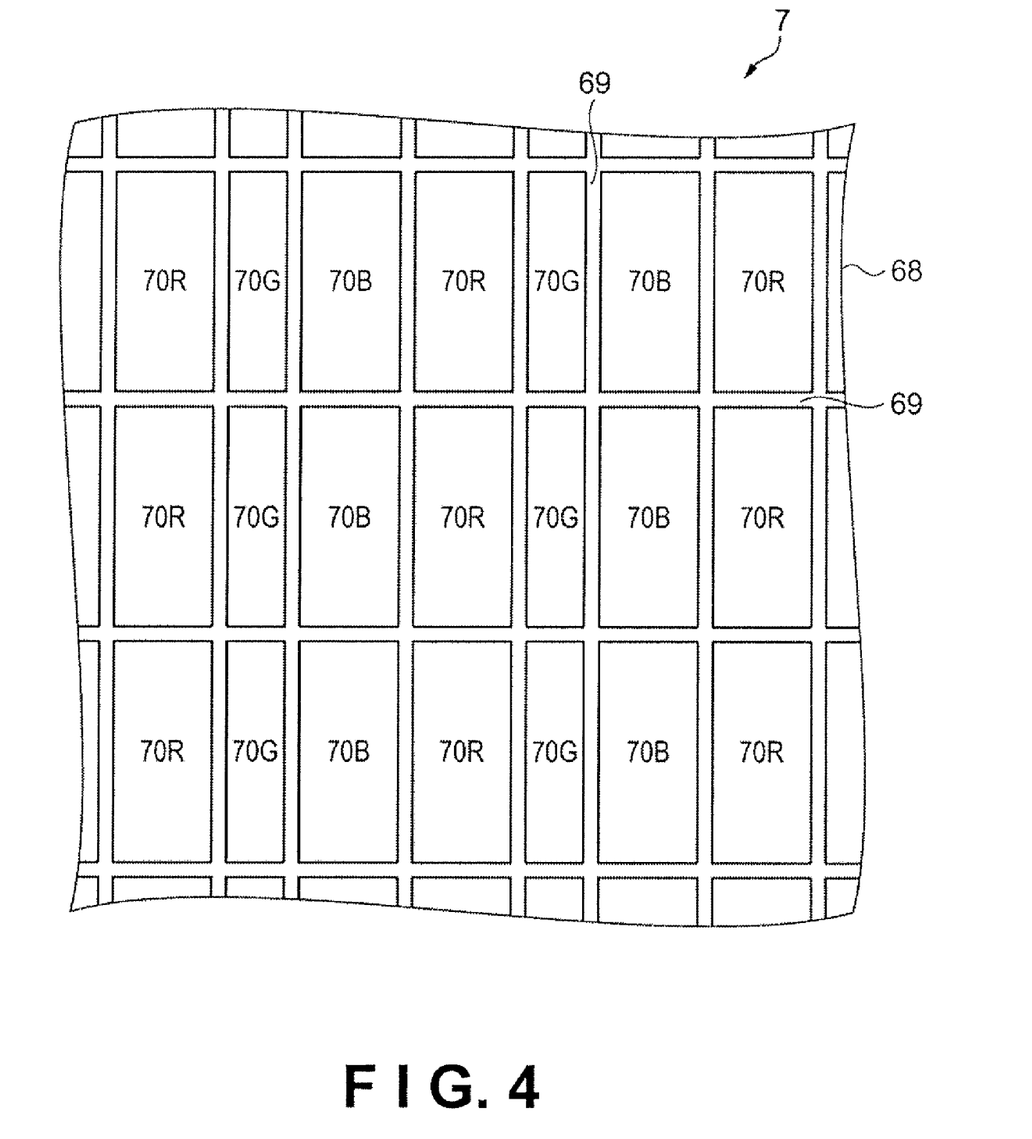
FIG. 4 is a plan view showing an array of pattern film formation regions.

Next, the arrangement of the discharge heads 140 will be described. In the present embodiment, the number of discharge heads 140 is specified and arranged in accordance with the width of each pattern film formation region disposed on the substrate 7. In view of this configuration, the pattern film formation regions of the substrate 7 in the present embodiment will first be described. FIG. 4 is a plan view showing an array of pattern film formation regions disposed on the substrate 7. In the present embodiment, an organic EL device will be described as an example. The substrate 7 has first to third pattern film formation regions 70R, 70G, 70B partitioned by a partition section 69 provided to base 68, as shown in FIG. 4. The droplet discharge device 1 is used for coating a functional liquid containing a red organic compound in the first pattern film formation regions 70R so as to form a first pattern film R in the first pattern film formation regions 70R. Similarly, a functional liquid containing a green organic compound is coated in the second pattern film formation regions 70G so as to form a second pattern film G in the second pattern film formation regions 70G; and a functional liquid containing a blue organic compound is coated in the third pattern film formation regions 70B so as to form a third pattern film B in the second pattern film formation regions 70B.

The first to third pattern film formation regions 70R, 70G, 70B are aligned in the form of a matrix on the base 68, as shown in FIG. 4. The sizes of the region surface areas of the first to third pattern film formation regions 70R, 70G, 70B differ. In the present embodiment, the region surface area of the second pattern film formation regions 70G is the smallest, and the region surface areas of the first and third pattern film formation regions 70R, 70B are greater than the region surface area of the second pattern film formation regions 70G. The first and third pattern film formation regions 70R, 70B have substantially the same region surface areas. In this manner, the surface area of the pattern film formation regions are made to be different and the first to third pattern films R, G, B having different surface areas are formed, whereby the service life of an organic EL device can be extended and the white balance can be readily achieved.

As described above, droplets 36 are discharged from the discharge heads 140 on to the substrate 7 in which the surface areas of the first to third pattern film formation regions 70R, 70G, 70B are different, and in the case that the functional liquid is coated in the first to third pattern film formation regions 70R, 70G, 70B, the droplets are readily coated in sufficient amount in the first and third pattern film formation regions 70R, 70B because the regions are large. However, the number of discharges of droplets 36 is limited in the case that the region surface area is small in the second pattern film formation regions 70G, and there is concern that the amount of functional liquid coated in the second pattern film formation regions 70G is insufficient.

Figure 5:
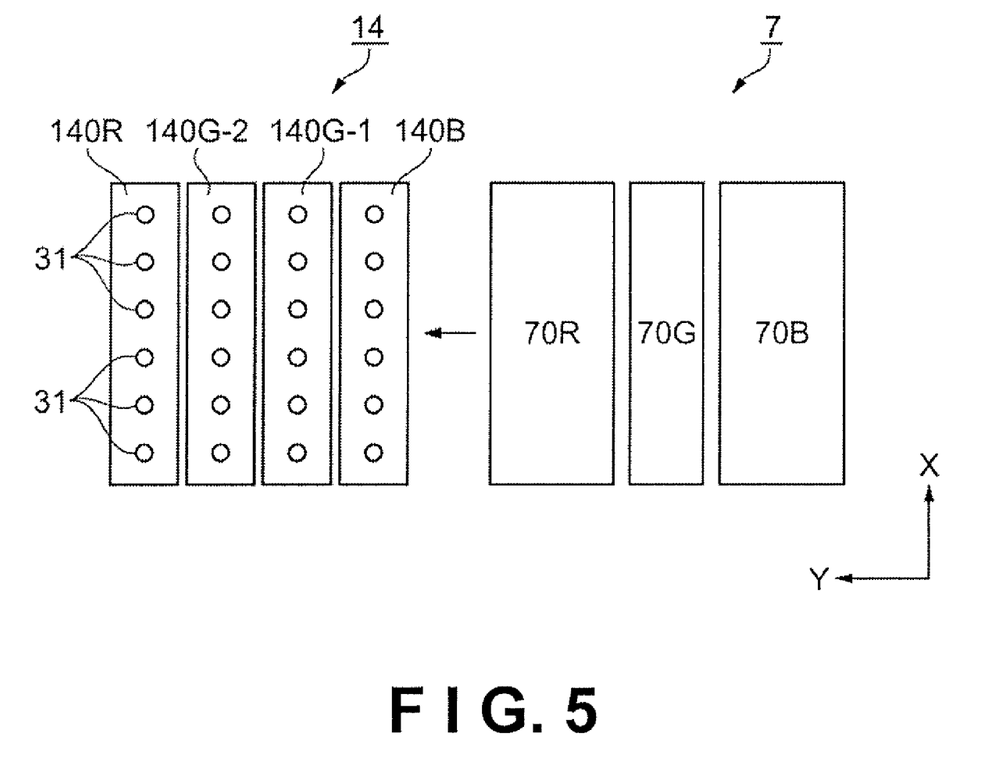
FIG. 5 is a plan view showing the arrangement of discharge heads.

In view of this, the discharge heads 140 that correspond to the first to third pattern film formation regions 70R, 70G, 70B are arranged in the following manner. FIG. 5 is a plan view showing the arrangement of discharge heads that correspond to the pattern film formation regions. The discharge heads 140 shown in FIG. 5 are shown in a plan view from above the droplet discharge device 1 through to the substrate 7, but to facilitate description, the nozzles 31 of the discharge heads 140 are shown with solid lines. Also, the arrows in the same drawing show the corresponding movement directions (primary scan direction: Y direction) of the substrate 7 and the discharge heads 140.

The head unit 14 is provided with a plurality of discharge heads 140R, 140G, 140B that correspond to each of the sizes of the first to third pattern film formation regions 70R, 70G, 70B provided to the substrate 7, as shown in FIG. 5. The number of discharge heads 140G that correspond to the second pattern film formation regions 70G, which are narrow pattern film formation regions, among the first to third pattern film formation regions 70R, 70G, 70B is greater than the number of discharge heads 140R, 140B that correspond to the first and third pattern film formation regions 70R, 70B, which are pattern film formation regions having larger region areas than the second pattern film formation regions 70G. In the present embodiment, one each of the discharge heads 140R, 140B that correspond to the first and third pattern film formation regions 70R, 70B is arranged, two discharge heads 140G that correspond to the second pattern film formation regions 70G are arranged, and a total of four discharge heads 140 are provided. The discharge heads 140R, 140G, 140B are arranged in sequence in the scan direction in accordance with the array sequence of the first to third pattern film formation regions 70R, 70G, 70B in the scan direction (Y direction). In the present embodiment, a first pattern film formation region 70R, a second pattern film formation region 70G, and a third pattern film formation region 70B are arranged in sequence from the left side in FIG. 5 toward the right side, and a discharge head 140R, a discharge head 140G, and a discharge head 140B are arranged in sequence from the left side in FIG. 5 toward the right side. Accordingly, droplets 36 can be discharged in an efficient manner in desired pattern film formation regions by arranging the discharge heads 140R, 140G, 140B in accordance with the array sequence of the first to third pattern film formation regions 70R, 70G, 70B.

In the present embodiment, the widths of the first to third pattern film formation regions 70R, 70G, 70B in the scan direction (Y direction) in which the substrate 7 and the discharge heads 140 move in a relative fashion. The number of discharge heads 140G that correspond to the second pattern film formation regions 70G, which are narrow pattern film formation regions, is greater than the number of discharge heads 140R, 140B that correspond to the first and third pattern film formation regions 70R, 70B, which are pattern film formation regions that are wider than the second pattern film formation regions 70G. Accordingly, the opportunities for discharging droplets 36 into narrow pattern film formation regions is increased and a specified coating amount can be achieved by increasing the number of discharge heads 140 in pattern film formation regions that are narrow in the scan direction, in comparison with other pattern film regions.

In relation to the widths of the first to third pattern film formation regions 70R, 70G, 70B in the scan direction, when the width of the second pattern film formation regions 70G, which are narrow pattern film formation regions, is about 1/n of the width of the first and third pattern film formation regions 70R, 70B, which are wide pattern film formation regions, the number of discharge heads 140G arranged in correspondence to the second pattern film formation regions 70G may be in multiples of n (the nth multiple) or more or the number of discharge heads 140R, 140B that correspond to the first and third pattern film formation regions 70R, 70B. In the present embodiment, the width of the second pattern film formation regions 70G in the scan direction is about ½ the width of the first and third pattern film formation regions 70R, 70B. Therefore, the number of discharge heads 140G arranged in correspondence to the second pattern film formation regions 70G is two, which is double that of the one each of the discharge heads 140R, 140B that correspond to the first and third pattern film formation regions 70R, 70B. Accordingly, the droplets 36 can be adequately discharged in the pattern film formation regions by specifying the number of discharge heads 140 on the basis of the ratio of the widths of the pattern film formation regions 70.

Droplet Discharge Method

Figure 6:
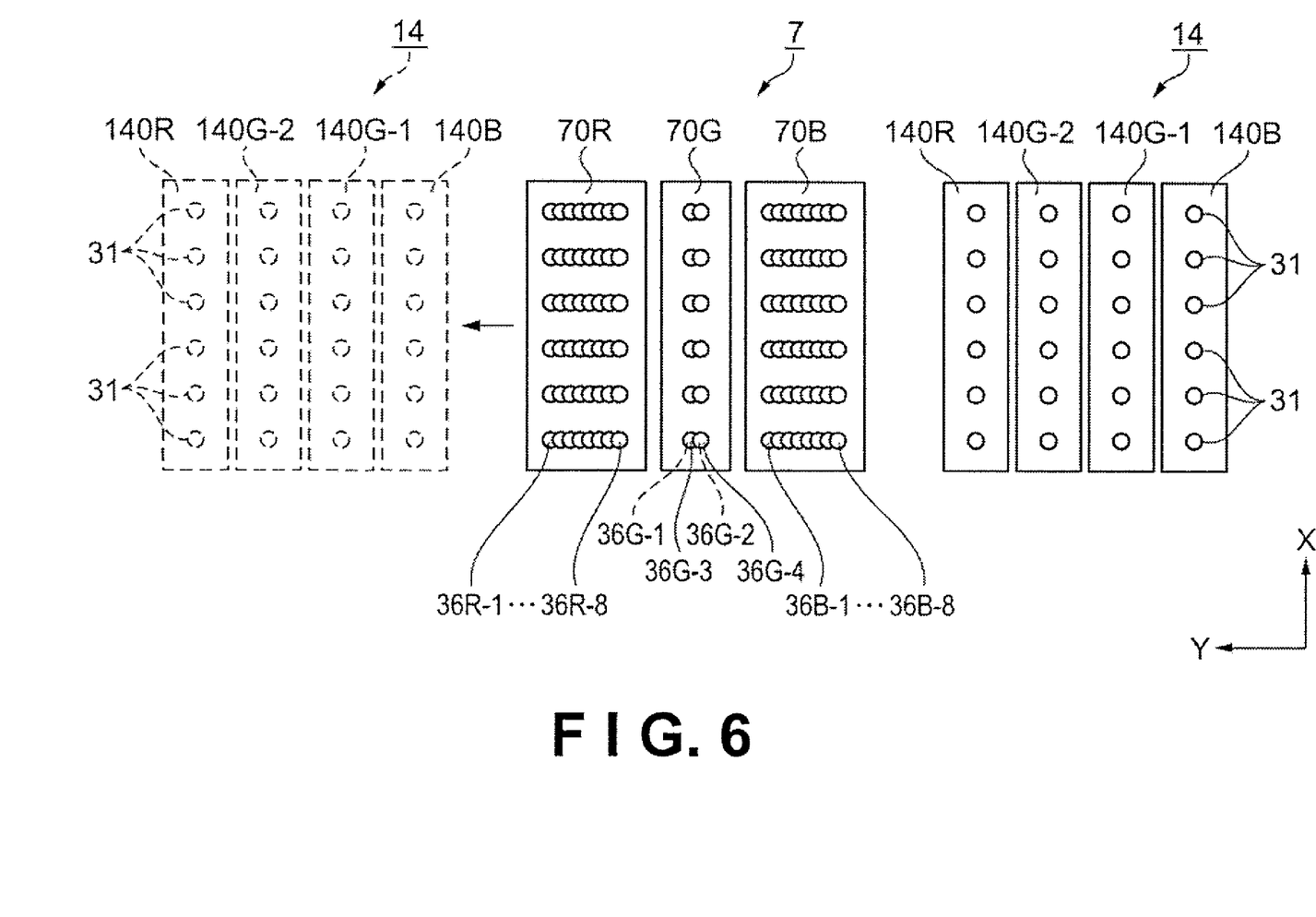
FIG. 6 is a schematic view showing the deposit state of droplets in the pattern film formation regions.

Next, the method for discharging droplets 36 from the discharge heads 140R, 140G, 140B into the first to third pattern film formation regions 70R, 70G, 70B will be described. FIG. 6 is a schematic view showing the state of droplets deposited in the pattern film formation regions. In the drawing, it is shown that the substrate 7 and the head unit 14 (discharge heads 140) move (primary scan direction: Y direction) in a relative fashion at a constant speed, and in the process of a single discharge scan, the droplets 36 are discharged from the discharge heads 140R, 140G, 140B, and the droplets 36 thus discharged are deposited in the first to third pattern film formation regions 70R, 70G, 70B. For the sake of convenience, six nozzles 31 of the discharge heads 140R, 140G, 140B are shown. Also, the first and third pattern film formation regions 70R, 70B have the same region surface area, and the second pattern film formation region 70G is about half the size of the first and third pattern film formation regions 70R, 70B. In the present embodiment, the width of the second pattern film formation region 70G is about half the width of the first and third pattern film formation regions 70R, 70B in the scan direction (Y direction).

First, the method for discharging droplets 36 into the third pattern film formation region 70B will be described. Droplets 36B are discharged from the discharge heads 140B into the third pattern film formation region 70B, and the droplets 36B are deposited in the third pattern film formation region 70B. Specifically, the primary scan drive device 42 is driven and the substrate 7 and the head unit 14 are moved in a relative fashion. A drive signal is transmitted to the discharge heads 140B in a position in which the third pattern film formation region 70B and the discharge heads 140B face each other, the piezoelectric elements 35 are driven based on the drive signal, droplets 36B are discharged from the nozzles 31 in accompaniment with the driving, and a droplet 36B-1 is deposited in the third pattern film formation region 70B. Droplets 36B continue to be discharged and droplets 36B-1 to 36B-8 are deposited in sequence in the third pattern film formation region 70B in a single scan cycle. Therefore, eight droplets are discharged from the six nozzles 31 of the discharge heads 140B into the third pattern film formation region 70B, and a total of 48 droplets 36B are therefore deposited.

In a similar manner for the first pattern film formation region 70R, a drive signal is transmitted to the discharge heads 140R in a position in which the first pattern film formation region 70R and the discharge heads 140R face each other, the piezoelectric elements 35 are driven based on the drive signal, droplets 36R are discharged from the nozzles 31 in accompaniment with the driving, and a droplet 36R-1 is deposited in the first pattern film formation region 70R. Droplets 36R continue to be discharged and droplets 36R-1 to 36R-8 are deposited in sequence in the first pattern film formation region 70R in a single scan cycle. Therefore, a total of 48 droplets 36R are deposited in the first pattern film formation regions 70R as well.

Next, the method for discharging droplets 36 into the second pattern film formation region 70G will be described. Droplets 36G are discharged from the two discharge heads 140G-1, 140G-2 into the second pattern film formation region 70G, and the droplets 36G are deposited in the second pattern film formation region 70G. Specifically, the primary scan drive device 42 is driven and the substrate 7 and the head unit 14 are moved in a relative fashion. First, a drive signal is transmitted to the discharge heads 140G-1 in a position in which the second pattern film formation region 70G and the discharge heads 140G-1 face each other, the piezoelectric elements 35 are driven based on the drive signal, droplets 36G are discharged from the nozzles 31 in accompaniment with the driving, and a droplet 36G-1 is deposited in the second pattern film formation region 70G. Droplets 36G continue to be discharged and droplets 36G-1 and 36G-2 are deposited in sequence in the second pattern film formation region 70G in a single scan cycle of the discharge head 140G-1. Therefore, a total of 12 droplets 36G are discharged from the discharge head 140G-1 and are deposited in the second pattern film formation region 70G.

Furthermore, in accompaniment with the scanning of the substrate 7, a drive signal is transmitted to the discharge heads 140G-2 in a position in which the second pattern film formation region 70G and the discharge heads 140G-2 face each other, the piezoelectric elements 35 are driven based on the drive signal, droplets 36G are discharged from the nozzles 31 in accompaniment with the driving, and a droplet 36G-3 is deposited in the second pattern film formation region 70G. Droplets 36G continue to be discharged and droplets 36G-3 and 36G-4 are deposited in sequence in the second pattern film formation region 70G in a single scan cycle of the discharge head 140G-2. Therefore, a total of 12 droplets 36G are discharged from the discharge head 140G-2 and are deposited in the second pattern film formation region 70G. Therefore, 24 droplets 36G are ultimately deposited in the second pattern film formation region 70G. Therefore, 24 droplets is half the number of deposits (48 droplets) of the first and third pattern film formation regions 70R, 70B, but when converted to a surface area ratio (1:2), the same number of droplets 36 are deposited in any of the first to third pattern film formation regions 70R, 70G, 70B. Therefore, in a single scan cycle, the same quantity of droplets is coated in terms of the surface area ratio of the regions in the first to third pattern film formation regions 70R, 70G, 70B.

In the case that a pattern film thickness is required, the droplet discharge described above can be repeated (a plurality of scan cycles), and droplets 36 may be additionally discharged into the first to third pattern film formation regions 70R, 70G, 70B.

Accordingly, the following effects are achieved in accordance with the embodiment described above.

The discharge heads 140G that correspond to the second pattern film formation regions 70G having a smaller region surface area than other regions among the first to third pattern film formation regions 70R, 70G, 70B are arranged in greater number than the number of discharge heads 140R, 140B that correspond to the first and third pattern film formation regions 70R, 70B. Therefore, in terms of surface area ratio, the same quantity of droplets 36 can be coated in the second pattern film formation regions 70G, which are narrow pattern film formation regions, and in the first and third pattern film formation regions 70R, 70B, which are wide pattern film formation regions.

No limitation is imposed by the embodiment described above, and the following modifications are possible.

Modified Example 1

Figure 7:
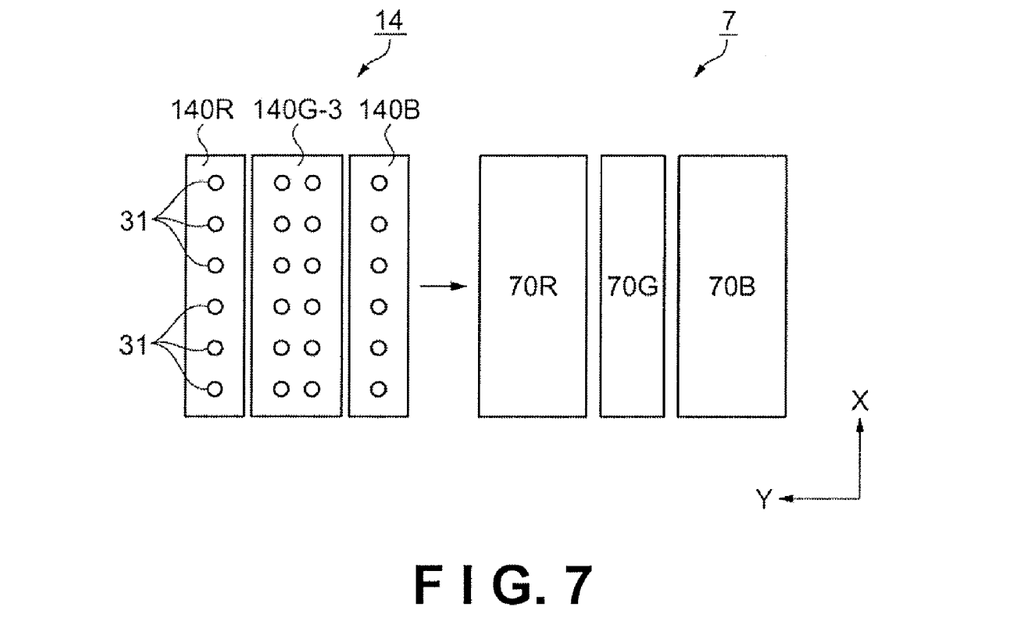
FIG. 7 is a plan view showing an array of discharge heads in a modified example.

In the present embodiment, two discharge heads 140G-1, 140G-2 are arranged in correspondence with the second pattern film formation regions 70G, but no limitation is imposed thereby. For example, a single discharge head 140G-3 may be arranged, as shown in FIG. 7. In this case, the nozzles 31 of the discharge head 140G-3 are provided in greater number than the other nozzles 31 of the discharge heads 140R, 140B that correspond to the first and third pattern film formation regions 70R, 70B. Even in such applications, the same effects as those described above can be achieved.

Modified Example 2

Figure 8:
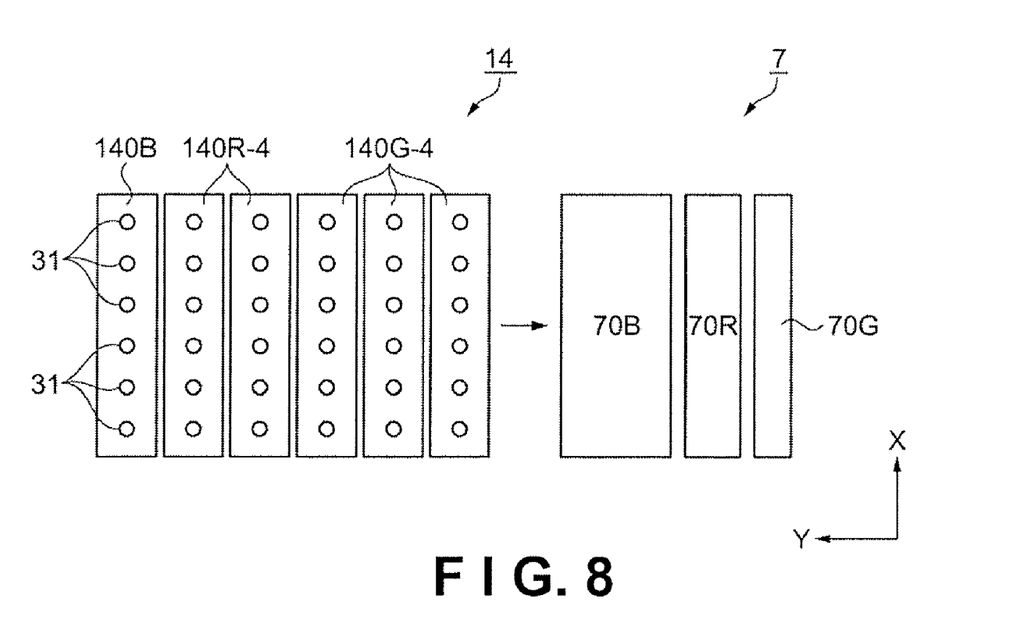
FIG. 8 is a plan view showing an array of discharge heads in yet another modified example.

In the embodiment described above, the arrangement of the discharge heads 140 that correspond to the pattern film regions having two sizes in terms of region surface area, but discharge heads 140 may be arranged in correspondence with pattern film regions having three or more differing sizes in terms of region surface area. For example, discharge heads 140 may be arranged in correspondence with third pattern film formation regions 70B having the greatest region surface area, first pattern film formation regions 70R having substantially ½ the region surface area of the third pattern film formation regions 70B, and second pattern film formation regions 70G having substantially ⅓ the region surface area of the third pattern film formation regions 70B, as shown in FIG. 8. In this case a single discharge head 140B is arranged in correspondence to the third pattern film formation regions 70B, two discharge heads 140R-4 are arranged in correspondence to the first pattern film formation regions 70R, and three discharge heads 140G-4 are arranged in correspondence to the second pattern film formation regions 70G. In this manner, the number of discharge heads 140 that correspond to the pattern film formation regions is increased as the pattern film formation regions become narrow, or as the width of the pattern film formation regions in the scan direction is reduced. Even in such applications, the same effects as those described above can be achieved.

Modified Example 3

In the embodiment described above, three color pattern film elements R, G, B were described, but no limitation is imposed thereby. For example, application can also be made to cases in which one or two color elements are formed. Application can furthermore be made to cases in which four or more color elements are formed. Even in such applications, the same effects as those described above can be achieved.

Modified Example 4

In the droplet discharge device 1 of the embodiment described above, an organic EL device is described as an example, but no limitation is imposed thereby. For example, application can also be made to color filters, plasma display panels, and the like. Even in such applications, the same effects as those described above can be achieved.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A droplet discharge device comprising:
a plurality of discharge heads configured and arranged to discharge droplets toward a plurality of pattern film formation regions disposed on a substrate with the pattern film formation regions including at least one narrow pattern film formation region that is narrower than the other pattern film formation regions, a number of the discharge heads corresponding to the narrow pattern film formation region being greater than a number of the discharge heads corresponding to one of the pattern film formation regions having an area that is larger than that of the narrow pattern film formation region.

2. The droplet discharge device according to claim 1, wherein
the discharge heads corresponding to the pattern film formation regions are aligned in a scan direction, in which the substrate and the discharge heads move relative to one another, according to a sequence in which the pattern film formation regions are aligned in the scan direction.

3. The droplet discharge device according to claim 1, wherein
the number of the discharge heads corresponding to the narrow pattern film formation region is greater than the number of the discharge heads corresponding to one of the pattern film formation regions having a width that is larger than that of the narrow pattern film formation region in a scan direction, in which the substrate and the discharge heads move relative to one another, when widths of the pattern film formation regions are different in the scan direction.

4. The droplet discharge device according to claim 3, wherein
the number of the discharge heads corresponding to the narrow pattern film formation region is equal to or greater than the nth multiple of the number of the discharge heads corresponding to one of the pattern film formation regions having the width that is larger than that of the narrow pattern film formation region, when the width of the narrow pattern film formation region is 1/n of the width of the one of the pattern film formation regions.

* * * * *